United States Patent [19]

Albertsson

[11] 4,384,478
[45] May 24, 1983

[54] SYSTEM FOR INDICATING OPTIMUM OPERATING ECONOMY OF INTERNAL COMBUSTION ENGINES IN BOATS

[76] Inventor: Nils Albertsson, Grevgatan 40, 114 53 Stockholm, Sweden

[21] Appl. No.: 240,678

[22] Filed: Mar. 5, 1981

[51] Int. Cl.³ .............................................. G01F 9/02
[52] U.S. Cl. ..................................................... 73/114
[58] Field of Search ................................. 73/113, 114

[56] References Cited

U.S. PATENT DOCUMENTS

| | | | |
|---|---|---|---|
| 2,395,042 | 2/1946 | Flatt | 73/114 X |
| 2,500,585 | 3/1950 | Sylvander | 73/114 |
| 3,084,539 | 4/1963 | Wentworth | 73/114 |
| 3,673,863 | 7/1972 | Spacek | 73/114 |

FOREIGN PATENT DOCUMENTS

| | | |
|---|---|---|
| 976529 | 3/1951 | France . |
| 976530 | 3/1951 | France . |
| 1134864 | 4/1957 | France . |
| 1162371 | 9/1958 | France . |
| 660607 | 11/1951 | United Kingdom . |
| 660608 | 11/1951 | United Kingdom . |
| 764608 | 12/1956 | United Kingdom . |
| 790798 | 2/1958 | United Kingdom . |
| 805555 | 12/1958 | United Kingdom . |

Primary Examiner—Jerry W. Myracle
Attorney, Agent, or Firm—Sughrue, Mion, Zinn, Macpeak & Seas

[57] ABSTRACT

A system for indicating economy of operation in internal combustion engines in boats so that a specific number of revolutions for fuel economy may be set. Two measuring devices are utilized, the output signal of one being proportional to the number of revolutions of the boat engine, whereas the output signal of the other is proportional to the flow of fuel to the engine. These two signals are compared in an indicator device, which as a result exhibits at least one extreme value in the operational range, whereby it becomes possible to find a favorable number of revolutions for operation with a high degree of efficiency and to avoid numbers of revolutions with a low degree of efficiency in simple manner.

6 Claims, 1 Drawing Figure

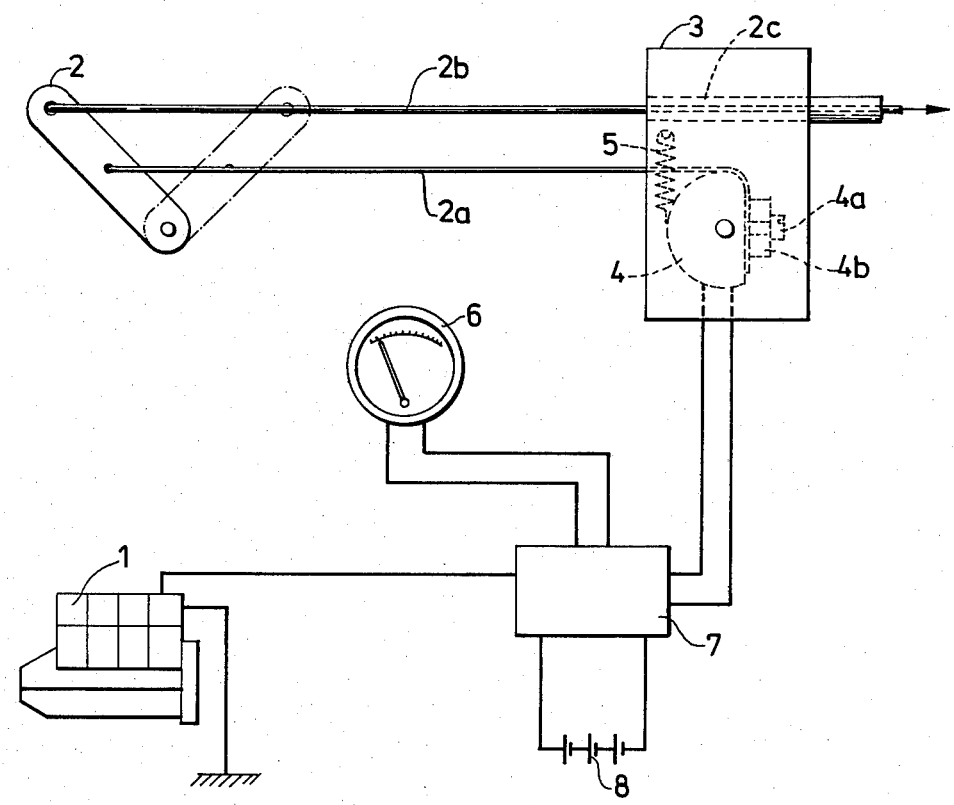

SYSTEM FOR INDICATING OPTIMUM OPERATING ECONOMY OF INTERNAL COMBUSTION ENGINES IN BOATS

BACKGROUND OF THE INVENTION

1. Field of the Invention

This invention refers to a system for indicating economy of operation in internal combustion engines in boats so as to make it feasible to set a specific number of revolutions of the engines for achieving fuel economy.

2. Description of the Prior Art

In the operation of boats or other craft having internal combustion engines the power requirements and thus the consumption of fuel often increase heavily with the speed or number of revolutions of the engine of the boat. In boats the consumed power may be expressed as the product of a braking force on the hull and the speed. The braking force is caused on one hand by the friction against the water, which increases approximately with the square of the speed, and on the other hand by the resistance of the shape and waves, with the latter resistance being affected by the relationship of the length of the hull and the length of the generated waves at the relevant speed. Furthermore, the braking force is influenced as the result of the wet area of the boat varying with the speed. The requirement of power may be expressed as a sum of exponential terms with the exponents varying between 1 and 4 and an additional interference term which changes between a positive and a negative value at different speeds. In conditions of operation in which the interference term is positive the power consumption becomes greater than the "average value" adjusted to the relevant speed.

SUMMARY OF THE INVENTION

The system disclosed by the invention may appropriately be implemented in the form of an indicating instrument which enables a comparison to be carried out between the actual fuel consumption and a "theoretical" fuel consumption which is based on similar conditions of operation without interference terms. By adjusting the number of revolutions of the engine it then often becomes possible to find a slightly differing speed providing more favorable fuel economy. In boats having adjustable trim tabs the indicator can give an indication of an optimum adjustment corresponding to a specific throttling of the engine.

A basically simple embodiment of the invention can consist of a fuel flowmeter connected to the engine and an electric log. The measuring signal from the log is assumed to be proportional to the speed and is converted by speed or measuring voltage dependent means, for example a chain of resistors or semiconductor diodes, to a suitable non-linear speed dependency so that the output voltage corresponds to the theoretical power requirement in a boat which is uninfluenced by wave interference or the like. An approximate value of the corresponding measuring voltage may also be obtained from a device for sensing the number of revolutions of the engine having an appropriate characteristic.

In the indicator device, which may consist of a voltmeter, the measuring voltage obtained as above and serving as a reference voltage is compared to a measuring voltage which is proportional to the fuel flow. With appropriately selected precouplings the measuring range may be adjusted such, that the indicator shows a minimum value at a speed which provides good fuel economy and at a position where the measuring deflection is an indication of the deviation from the optimum value.

In a practical embodiment nearly the same effect can be obtained at lower cost if a designation of the fuel consumption is achieved by an appropriately geared potentiometer or some other sensor being connected to the throttle control in Otto engines or to the injection regulator of Diesel engines instead of by means of a separate flowmeter. A thermistor measuring the air velocity at the fresh air intake of the engine may alternatively be used instead of a potentiometer.

In consequence of the amount of fuel drawn into Otto engines being approximately proportional to the area of the throttle the apparatus is simplified to a considerable extent, particularly as the number of revolutions of the engines can be sensed in simple manner by means of an ignition pulse frequency meter or the like and also can be utilized as a power or speed reference. With increased throttling both the number of revolutions of the engine and the torque of the shaft are increased. Thus, the instrument can show whether the torque increases above a torque corresponding to the "average friction resistance" within the utilized speed range at a specific speed and a specific number of revolutions. In Diesel engines the signal corresponding to the area of the throttle may be derived from the pump setting and the indicator of the number of revolutions.

The necessary measuring values for providing the indicator setting may to some extent be replaced by or supplemented with meters for the torque and/or reactive force of the propeller shaft.

The indicator may for example be embodied as an indicating instrument, as a digital instrument or in the form of an acoustical signal device in which for example the tone level or character of the sound defines the condition of operation. The measuring signal may also be supplied to recording instruments, and additionally it may be used for directly operating the engine controls.

If an appropriately selected fixed voltage is supplied to the measuring value for the fuel flow the sensor signals may be combined so as to provide an indication of the total cost of fuel and time, for example in connection with renting boats, which can give the optimum speed another value.

More specifically, the system in accordance with the invention mentioned by way of introduction is characterized by the features set forth in the appended claims.

DESCRIPTION OF THE DRAWING

The invention will be described more specifically below with reference to the accompanying drawing which illustrates an example of the manner in which a system in accordance with the invention may be embodied in practice.

DESCRIPTION OF THE PREFERRED EMBODIMENT

In the drawing the designation 1 refers to the engine of a boat, for example a pleasure boat, and 2 is a throttle arm associated with the boat and being adjustable into various rotational positions or slanting positions, one of which is illustrated in solid lines with another one being shown in dashed lines. A carrier member 3 includes a potentiometer 4 operated by the throttle arm 2 by means of a wire 2a which in the illustrated case is connected approximately to the middle of the throttle arm 2 in the longitudinal direction of the latter at one end and is wound around part of the potentiometer 4 at the other end and is clamped to the potentiometer by means of a screw 4a and a nut 4b. Potentiometer 4 is counterbiased with regard to wire 2a by a tension spring 5. The upper end of the throttle arm 2 is connected to the throttle of the engine (not shown) by a bowden wire 2b extending through a sheath 2c in the carrier member 3.

The designation 6 refers to an indicating measuring instrument, 7 is an electric circuit, for example a printed circuit, having two inputs and one output, and 8 is a DC battery.

The system illustrated by the figure operates in such manner that a signal which is proportional to the number of revolutions of engine 1 is supplied from said engine to one input of the electric circuit 7, to whose other input an output signal from potentiometer 4 is supplied so as to provide an indication of the setting of the throttle, said setting also corresponding to the flow of fuel to the engine. The two mentioned signals are compared to each other in the electric circuit 7, and the resulting output signal of the circuit is supplied to indicator 6. The relationship between the two first-mentioned signals is such that the pointer of the indicator 6 reaches an obvious minimum setting when the relationship between the number of revolutions of the engine and the speed of the boat is the most favorable. Thus it is very simple for a boat driver to adjust the engine to the number of revolutions which is the best at the moment with regard to the flow of fuel of the engine by observing said indicator and the deflection of its pointer.

The invention is not limited to the embodiment described above and illustrated in the drawing, and this embodiment merely comprises an example of the invention and a mode in which it may be applied.

I claim:

1. A system for providing an indication of the most economical range of operation of an internal combustion engine of a boat, said system comprising:
   (a) a potentiometer for providing an electrical signal representing the rate of fuel flow to the engine,
   (b) a device for providing an electrical signal representing the speed of the boat, and
   (c) an indicator device for indicating the difference between the output signals of said potentiometer and said speed representing device.

2. A system in accordance with claim 1, wherein a cam is provided for adjusting the output of said potentiometer.

3. A system in accordance with claim 1 for use in boats having Otto engines, wherein said potentiometer signal represents the position of the carburetor throttle.

4. A system in accordance with claim 3, wherein said potentiometer signal represents the position of the throttle over a cam curve which is designed such that the input value of the potentiometer is approximately proportional to the area of the throttle opening.

5. A system in accordance with claim 1 for use in boats having Diesel engines, wherein said potentiometer is connected to power control linkage of an injection pump of the engine.

6. A system for providing an indication of the most economical range of operation of an internal combustion engine of a boat, said system comprising:
   (a) thermistor means for providing an electrical signal representing the rate of fuel flow to the engine,
   (b) a tachometer for providing an electrical signal representing the speed of the boat, and
   (c) an indicator for indicating the difference between the output signals from said thermistor means and said tachometer adjusted to correspond to actual speed in an optimum range.

* * * * *